Nov. 20, 1956   J. HATALA   2,770,983
KNOB
Filed Oct. 7, 1955
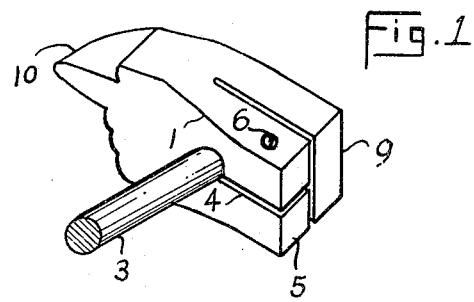
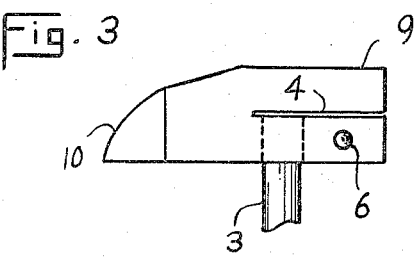
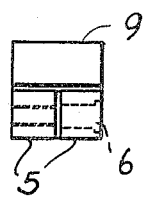
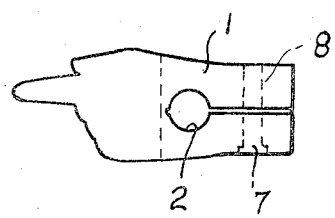
JOHN HATALA INVENTOR.
BY Nicholas J. Garofalo
his ATTORNEY United States Patent Office 2,770,983
Patented Nov. 20, 1956

2,770,983
KNOB
John Hatala, Flushing, N. Y.
Application October 7, 1955, Serial No. 539,176
7 Claims. (Cl. 74—553)

This invention is concerned with new and useful improvements in knobs, such as are intended to be mounted to shafts for manually turning, pulling or otherwise actuating the latter; and it is an object of this invention to provide a knob that may be mounted to a shaft without mutilating or changing the form of the shaft, and may be mounted in such a manner that it will not loosen thereon, slip, or pull free, and yet, when necessary, may be easily removed without damage to itself or to the shaft.

While the invention is subject to wide application, it is of special use and advantage in the electronics industry as a means of manually operating the control shafts of variout devices. Knobs are usually mounted on the ends of shafts that project through housings, cabinets and other walls of instruments to permit manual control of the instrument from the outside. On many occasions, such as during the development of an instrument, they are applied to a shaft for an experimental operation of the instrument. Knobs having these and other uses are usually mounted so that they can, when desired, be readily removed, so as to allow removal of the instrument itself from the housing or cabinet, and for various other reasons. Various methods have been employed in mounting a knob to a shaft so that the knob may, if desired, be subsequently removed. Conventional methods employed are set screws, pins, friction fits, and a variety of springs. These all have a common fault, in that a secure bond of the knob to the shaft is of short duration, as the knob, soon after it has been put in use, will slip, loosen, slide or pull off the shaft. Attempts at tightening or refastening the knob upon the shaft often results in, besides inconvenience and loss of time, a damaged shaft or knob, and, as a consequence, an uneconomical situation. Other methods commonly used in mounting a knob to a shaft require mutilations in the shaft, such as pin holes, flats, threads, splines, and the like. However, knobs and methods of mounting, as above, continue to be employed for want of a more practical knob and method of mounting.

Now, I have devised a knob of an improved and practical nature, that is inexpensive to manufacture and solves the problems mentioned above in securing the knob to a shaft. The knob of the present invention is of such construction and form that it may be easily mounted to a shaft without making mutilations in the latter, and will not, even after long and continued use, slide, slip, pull off or otherwise loosen on the shaft. Yet, it may, when desired, be readily removed. It has the further advantage that, when reapplied to the shaft after removal, it may again be secured thereon without damage to itself or to the shaft.

A feature of the invention is a clamp structure formed in the body of the knob, which is hidden from view, and serves as a means of clamping the knob fast upon the shaft.

Another feature is a facing piece unitary with the body of the knob, which functions to not only conceal the clamp structure to its rear, but also serves as an indicator of information relative to the associated instrument.

A general object of the invention is to provide a knob for a shaft which may be mounted without mutilating the shaft and will not loosen upon the shaft after lengthy use, and yet may be readily removed and reapplied without damage to itself or to the shaft.

A further object of the invention is to provide a knob of insulating material which finds particular application in the electronic industry as a means of manually operating the shafts of electronic instruments, and which may be securely mounted to a shaft without fear of its becoming loose, and which may be readily removed or reused without damage to itself or to the shaft.

A still further object of the invention is to provide a knob for a shaft, wherein the knob is characterized by a clamp structure for mounting it to the shaft.

The invention further lies in its particular construction as fell as in the general arrangement and cooperative association of its component parts to produce the results intended.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description and are not to be construed as defining the limits of the invention.

In the drawings:
Fig. 1 is a perspective view of a knob embodying the invention;
Fig. 2 is a front elevational view;
Fig. 3 is a top plan view;
Fig. 4 is a rear elevational view; and
Fig. 5 is a right end view.

Reference is now directed to the drawings for a more detailed description of the invention, wherein there is shown a knob including a rear body portion 1 of thickened dimensions through which is an axial hole 2 adapted to closely accommodate an end of a complementary cylindrical shaft 3. The body portion here is of substantially oblong proportions, though it may well be of circular or other configuration. This body portion is split or slotted through, as at 4, from one end thereof to the hole 2, whereby a pair of opposed ears 5, one vertically above the other, are formed. This provides a clamp structure for mounting the knob to the shaft.

The material of the knob is desirably of a slightly resilient nature, thermoplastic material being desirable. This material is further desirable because of its insulating properties, which makes the knob particularly suitable for use with shafts of electronic instruments, wherein it is desired to insulate the instrument from the hand of the operator.

The free ends or ears 5 are spaced by the split a slight distance above one enother, and, because of their slightly resilient nature, the ears may be drawn toward one another so as to reduce the diameter of the hole. The hole in its normal condition is of a diameter slightly greater than that of the shaft which it is to accommodate, so as to provide a close fit of the latter therein. Screw means 6, passed through a vertically disposed hole 7 in one of the ears and threadedly engaged in a vertically disposed hole 8 in the other ear, when tightened, draws the ears together, whereby the normal diameter of the hole is reduced and a shaft received in the hole before such tightening becomes securely clamped and bound to the knob. The bond of shaft and clamp is so great that when the knob is turned, pushed, or pulled, it will not slip, slide, pull free or otherwise loosen upon the shaft. This clamping effect is increased by the slightly resilient quality of the clamp material.

It is further desired to so form a knob having a clamp structure as above described, wherein the latter is substantially concealed from the observer. To this end there is provided a piece 9 which fronts or faces the knob and conceals the clamp structure of the body portion to its rear. Here, this front piece is unitary or integral at one end with the end of the body portion that adjoins the hole in opposed relation to the split. The front piece continues from this latter end laterally over and in close spaced relation to the forward end of the hole and the front sides of the ear elements. The front piece is of a height and width, preferably at least equal to that of the body portion at its rear. By this structure and relating arrangement of the front portion to the rear body portion of the knob, the clamp element is concealed from the view of the observer.

Further, the front piece may be ornamentally designed or be of suitable configuration having a useful purpose. Here, it assumes, as shown, the form of an indicating hand having a pointer finger 10. In this form the knob may cooperate with a suitable dial face or other fixed reference mark of the instrument to indicate certain information relative to the instrument. The clamp structure of the knob further permits an easy angular adjustment of the position of the pointer before the knob is tightened on the shaft.

While an embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art; and it is my intent, therefore, to claim the invention not only in the form shown and described, but also in all such forms and modifications as can be reasonably construed to fall within the spirit of the invention and the scope of the appended claims.

What is claimed is:

1. A control knob for use with an electronic instrument control shaft, comprising an inner body portion of insulating material having slight resilience, the body portion having a cylindrical hole axially therethrough for a reception of a complementary end of the control shaft, a pair of ears defined by a slot perpendicular to the shaft axis of the hole and extending to the outside of one end of the body portion, screw means arranged in the ears for drawing them together to effect a consequent reduction in the diameter of the hole and a clamping grip of the wall of the hole upon the shaft that may have been received in the hole, and an outer portion fronting the body portion, the outer portion having one end integral with the body portion and the other end extending over the body portion in parallel relation thereto in close proximity to the hole and to the pair of ears.

2. A knob, removably mountable on a shaft for use in actuating the latter, comprising a body member of thickened proportions and substantially oblong form and having a cylindrical hole axially therethrough for closely accommodating an end of a cylindrical shaft, a pair of ears defined by a slot extending from the hole through to the outside of one end of the body portion, the body portion being formed of resilient material and including screw means in the ears for drawing the ears together to effect a clamping result of the wall of the hole upon any shaft accommodated therein, and a facing member joined at one end to the body portion, and the facing member having its other end free of the body portion and covering over an end of the hole and the ears.

3. A thermoplastic knob, removably mountable upon a cylindrical shaft for use in actuating the latter, comprising in combination a rear body member defining a clamp integral with the body member and having means for securing the clamp upon the shaft, and a facing member integral in part with the body member and concealing the latter from a front elevational view of the knob.

4. In the combination as in claim 3 wherein the clamp is characterized by an axial hole for receiving the shaft and by a pair of resilient ears extending tangently from the hole in spaced parallel relation to one another, and the means for securing the clamp on the shaft comprises a screw passing through one ear and threadedly engageable in the other for drawing the ears together and effecting a reduction of the size of the hole and a consequent securing of the clamp upon the shaft.

5. In a combination of a fixed reference mark, a shaft, and a knob fastened upon the shaft for rotation of the shaft upon turning of the knob, wherein the knob is characterized as having a body portion of plastics material including an axial cylindrical hole therethrough in which a complementary end of the shaft is received, a pair of ears defined by a split in the body portion extending from the hole through to the outside of one end of the body portion, screw means engaging the ears and holding the same in a condition wherein one ear is drawn toward the other and a clamping effect of the wall of the hole is provided upon the shaft, and as having a facing member covering in close proximity over an end of the hole and the ears and being integral at one end with the body portion, the facing member having the configuration of a pointer cooperable with the reference mark to indicate certain information.

6. In combination to form a control knob for a shaft, a member defining a body having an integral clamp portion for clamping upon the shaft, and an ornamental member facing over the clamp portion in close proximity thereto and integral at one end with the said body.

7. In a plastics knob of the character described including a facing member defining a reference pointer, a body member having an axial hole for accommodating a shaft end and including a pair of ears defined by a split from the hole through one end of the body, the ears being tensionable toward one another to provide a clamped condition of the body member upon the shaft, the ears and hole being to the rear of the facing member in close proximity to the latter, and the body portion having an end integral with an end of the facing member.

References Cited in the file of this patent

UNITED STATES PATENTS

| | | |
|---|---|---|
| 836,706 | Richards | Nov. 27, 1906 |
| 924,463 | Hofmann | June 8, 1909 |
| 1,420,295 | Tait | June 20, 1922 |
| 1,427,798 | Feeney | Sept. 5, 1922 |
| 1,523,305 | Spiro | Jan. 13, 1925 |
| 1,712,087 | Medholdt | May 7, 1929 |
| 2,172,977 | Kimball | Sept. 12, 1939 |